No. 781,357. PATENTED JAN. 31, 1905.
J. L. PENTECOST.
ANIMAL STOCK.
APPLICATION FILED MAY 6, 1904.
3 SHEETS—SHEET 1.
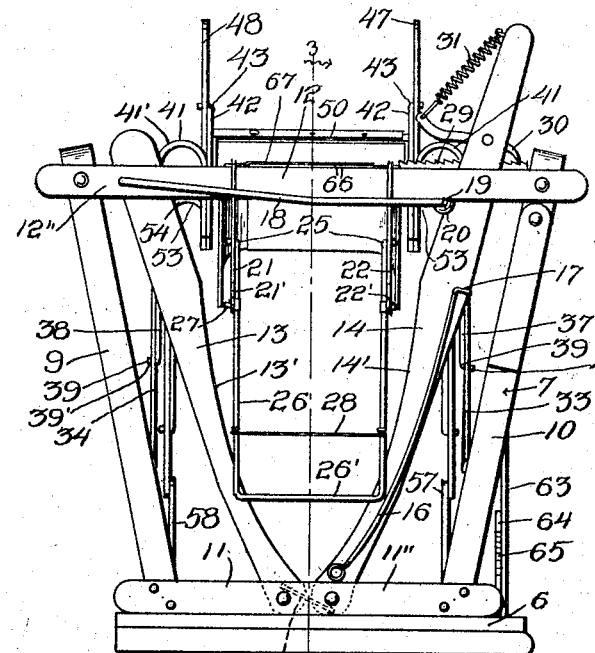
Fig. 1.
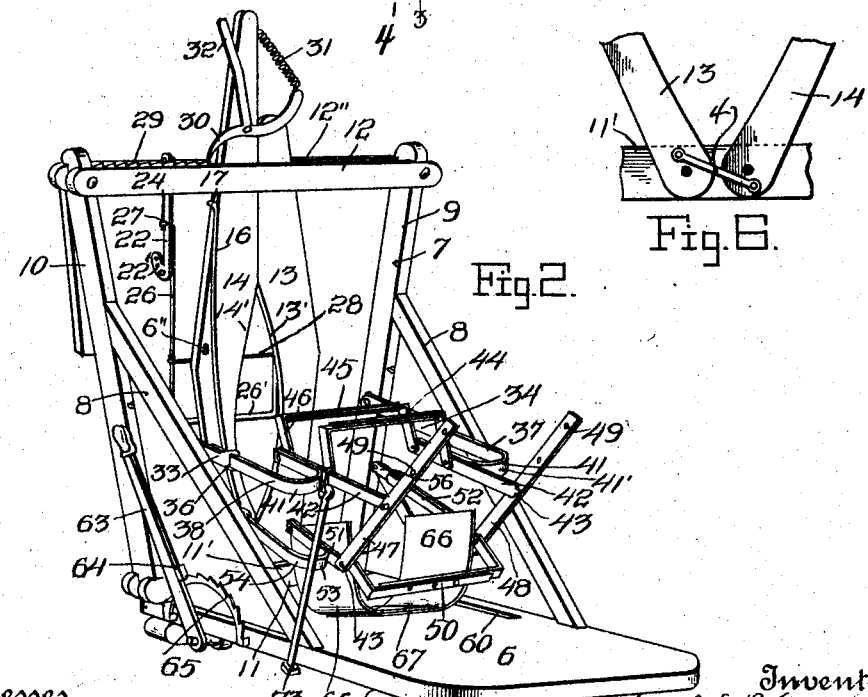
Fig. 2.
Fig. 6.
Witnesses
C. K. Reichenbach
W. C. O. Keyes
Inventor
J. L. Pentecost
by
Chandlee & Chandlee
Attorneys No. 781,357. PATENTED JAN. 31, 1905.
J. L. PENTECOST.
ANIMAL STOCK.
APPLICATION FILED MAY 6, 1904.

3 SHEETS—SHEET 2.

Witnesses
E. K. Reichenbach.
W. C. O. Keyes.

Inventor
J. L. Pentecost,
by
Chandler & Chandler
Attorneys

No. 781,357. PATENTED JAN. 31, 1905.
J. L. PENTECOST.
ANIMAL STOCK.
APPLICATION FILED MAY 6, 1904.

3 SHEETS—SHEET 3.

Witnesses
C. H. Reichenbach.
W. C. Keyes.

Inventor
J. L. Pentecost,
by Chandler & Chandler
Attorneys

No. 781,357. Patented January 31, 1905.

UNITED STATES PATENT OFFICE.

JOHN L. PENTECOST, OF LIBERTY, INDIANA.

ANIMAL-STOCK.

SPECIFICATION forming part of Letters Patent No. 781,357, dated January 31, 1905.

Application filed May 6, 1904. Serial No. 206,758.

*To all whom it may concern:*

Be it known that I, JOHN L. PENTECOST, a citizen of the United States, residing at Liberty, in the county of Union, State of Indiana, have invented certain new and useful Improvements in Animal-Stocks; and I do hereby declare the following to be a full, clear, and exact description of the invention, such as will enable others skilled in the art to which it appertains to make and use the same.

This invention relates to animal-stocks, and has for its object to provide a device of this nature which will securely hold an animal during the operation of ringing or branding, which will operate automatically when an animal enters the stock to prevent its escape therefrom, and which will be collapsible to occupy little space when not in use.

A further object is to provide a construction in which the stock will be adjustable to accommodate different-size animals.

Figure 3:
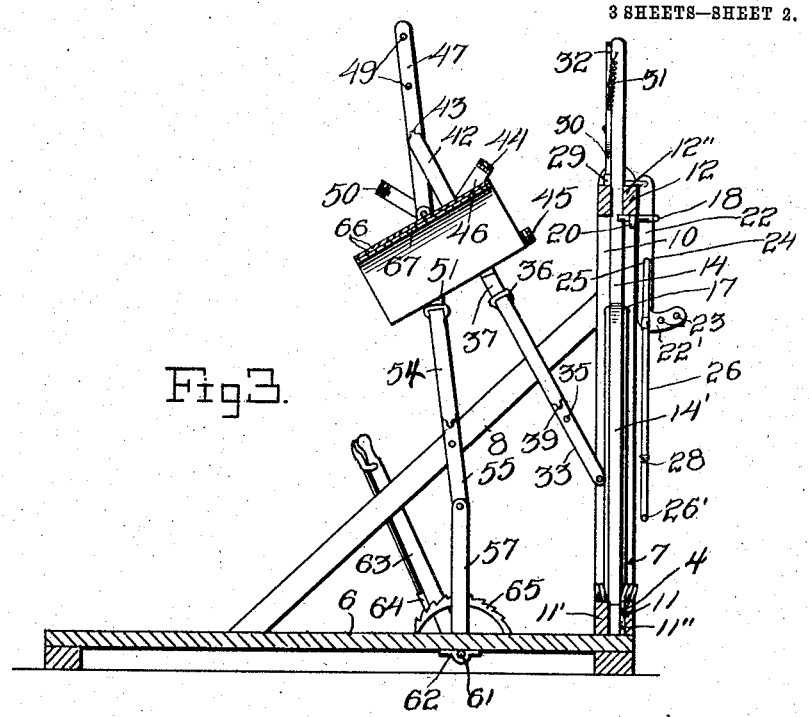
Figure 4:
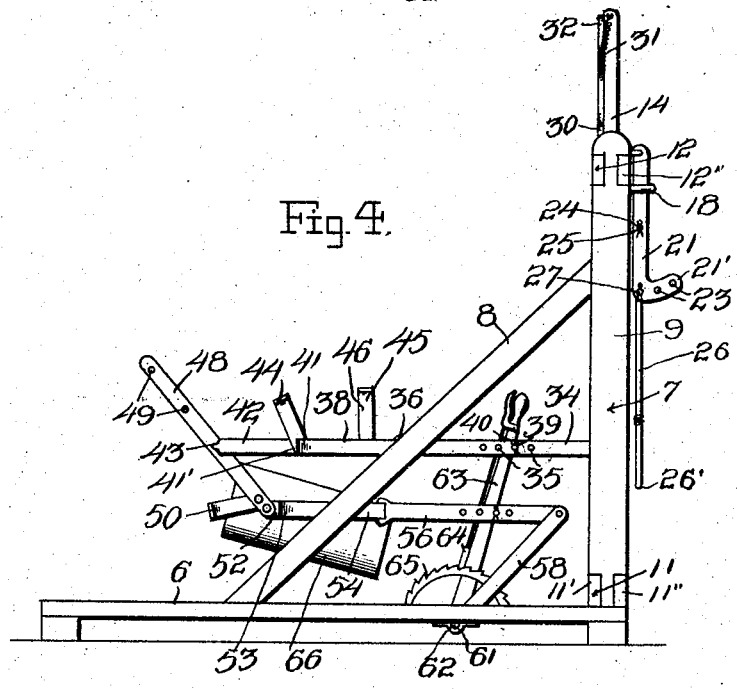
Figure 5:
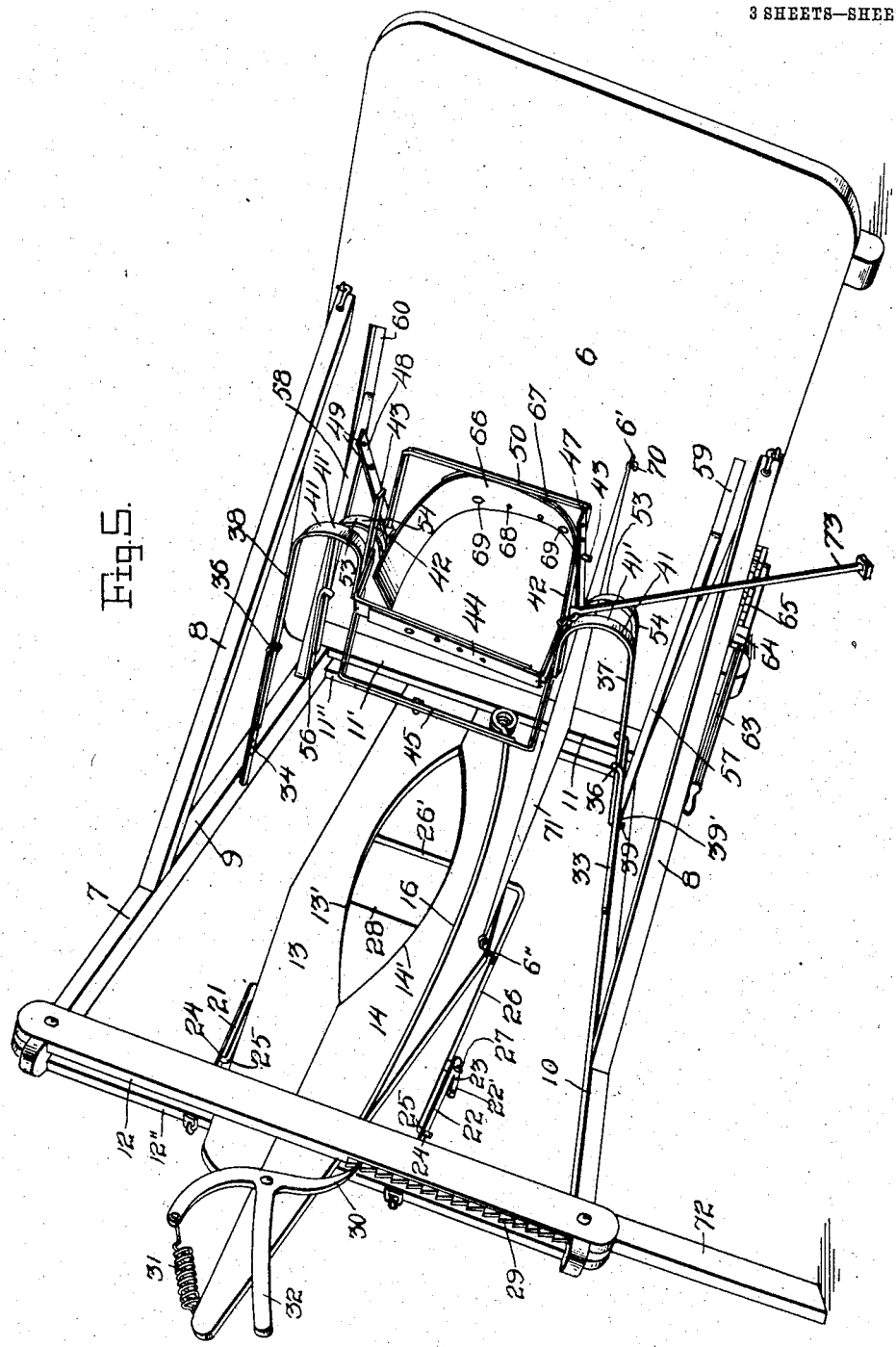

In the drawings forming a portion of this specification, and in which like numerals of reference indicate similar parts in the several views, Figure 1 is a front view of the stock opened. Fig. 2 is a rear perspective view of the stock closed. Fig. 3 is a section on line 3 3 of Fig. 1. Fig. 4 is a side elevation of the stock closed and with the leg-confining device in operative position. Fig. 5 is a perspective view of the stock placed in the position for the performance of the branding operation. Fig. 6 is a detail view of the lower ends of the neck-yokes and illustrating their connection with each other.

Referring now to the drawings, the present invention comprises a base 6 having a frame 7 hinged to its forward edge and having also braces 8 removably connected with the frame and the base to hold the former in upright position.

The frame includes diverging side pieces 9 and 10, which are connected at their tops and bottoms by pairs of cross-pieces 11 and 12, which are disposed at opposite sides of the side pieces. Pivoted between the cross-pieces 11' and 11" of the pair 11 are the lower ends of a pair of neck-yokes 13 and 14, having recesses 14' and 13' in their inner edges to receive the neck of an animal. The yokes 13 and 14 are connected, by means of a rod 4, in such a way that when one of the yokes is moved upon its pivot the other yoke is moved in the opposite direction.

Secured to the cross-pieces 11' and 11" are the lower ends of a spring-yoke 16, the bight 17 of which bears against the outer edge of the yoke 14 and acts to hold the two yokes normally in operative position. Attached to the cross-piece 12" of the pair 12 there is a spring-rod 18, having an inwardly-directed angular end 19, which is disposed in a loop 20, depending from the cross-piece, and this angular end is movable into engagement with the inner edge of the yoke 14 to hold it against the action of the spring-yoke 16.

Pivoted to the forward face of the cross-piece 12" are depending arms 21 and 22, having outwardly-extending ends 21' and 22', which are provided with perforations 23. The arms 21 are provided with perforations 24, with which are engaged the angular ends 25 of a depending U-shaped member 26, having lugs 27, which may be engaged interchangeably with the perforations 23 of the ends 21' and 22'. As shown, the arms 21 lie beneath the spring-rod 18, so that outward movement of the arm moves the angular end 19 of the rod out of engagement with the yoke 14, permitting the two yokes to come together under the action of the spring-yoke 16. The U-shaped member 26 has a cross-piece 28 connecting its side portions adjacent to their lower ends, and, as will be observed, this cross-piece is so disposed that an animal passing between the yokes 13 and 14 will engage its nose between the cross-piece 28 and the bight 26' of the U-shaped member to move the arms 21 and 22 upon their pivots and disengage the angular end of the rod 18 from the yoke 14, thus permitting the two yokes 13 and 14 to come together and catch the neck of the animal therebetween.

Secured to the upper edge of the cross-piece 12" of the pair 12 is a rack 29, and pivoted to the yoke 14 is a dog 30 for engagement with the rack to prevent movement of the yoke to its inoperative position, the dog being held in engagement with the rack by a helical spring 31 and having a handle 32, by which it may be disengaged from the rack to permit of separation of the yoke.

Pivoted to the side pieces 9 and 10 at their inner edges are a pair of arms 33 and 34, each having a plurality of perforations 35 arranged longitudinally thereof and an inwardly-directed laterally-extending loop 36 at its free end. With the loops 36 of the arms 33 and 34, respectively, are slidably engaged supplemental arms 37 and 38, which lie for a portion of their length against the arms 33 and 34 and which are provided at their inner ends with lugs 39, adapted for interchangeable engagement with the perforations 35, these lugs being provided with perforations 39' for the reception of cotter-pins 40 to prevent disengagement of the lugs from the perforations. The arms 37 and 38 project beyond the ends of the arms 33 and 34 and are bent inwardly and forwardly toward the frame 7 to form hooks 41, to each of which there is connected a bar 42, which lie parallel to the straight portions of the supplemental arms 37 and 38 and which extend rearwardly beyond the bights 41' of the hooks, the bars being provided at their rearward ends with outwardly-directed lugs 43 for a purpose which will be presently described.

Extensible yokes 44 and 45 are provided and have their angular ends 46 attached to the bars 42, these yokes being extensible to vary the distance between the bars 42 for a purpose to be hereinafter described.

Arms 47 and 48 are provided, each having a series of perforations 49 adjacent to its upper end, and these arms are disposed each with a perforation engaged with one of the lugs 43 in such a way that pivotal movement of the arms thereon is permitted, and it will be understood that the remaining perforations of each arm may be engaged with the lugs to cause the arms to project to a greater or lesser degree below the bars 42. Adjacent to their lower ends the arms 47 and 48 are connected by a rearwardly-extending extensible yoke 50, similar to the yokes 44 and 45, by which the distance between the arms 47 and 48 may be varied to correspond to the distance between bars 42.

Pivoted to the lower ends of the arms 47 and 48 are a pair of bars 51 and 52, which have secured thereto the hooked ends 53 of supplemental arms 54, which are similar to the supplemental arms 37 and 38 and which form continuations of arms 55 and 56, similar to the arms 33 and 34. The connection of the supplemental arms 54 with the arms 55 and 56 is the same as the connection of the supplemental arms 37 and 38 with the arms 33 and 34. The arms 55 and 56 are pivoted at their ends to levers 57 and 58, which lie in longitudinal slots 59 and 60 in the base 6 and are connected therebelow to a transverse rock-shaft 61, mounted in bearings 62, depending from the base. The shaft 61 extends beyond the base at one end and is provided with a hand-lever 63, by which it may be rocked, this hand-lever having a spring-actuating dog 64 for engagement with a rack 65 to hold the shaft at different points of its movement. Secured to each of the bars 51 is an arc-shape metallic plate 66, which extends inwardly, the edge portions 67 of the plates overlapping, as shown, these edge portions being provided with alining perforations 68 for the reception of bolts 69, the perforations being arranged in series, as shown, so that the plates may be adjusted to conform to the adjustment of the yokes 44, 45, and 50.

In use when the operation of ringing and branding of animals is to be performed the stock is placed at the end of chute and an animal is driven thereinto. Previous to this disposition of the stock the yokes 13 and 14 are separated and the rod 18 brought into position to hold them apart, and the hand-lever 64 is operated to bring the remainder of the mechanism into the position shown in Fig. 1. When the animal attempts to escape from the chute between the openings 13 and 14, its nose comes into contact with the U-shaped member 26 and the yokes are released, as mentioned above, to catch and hold the neck of the animal therebetween. The animal is now securely confined and the ringing operation may be easily performed.

Before setting the stock the operator determines the size of the animals to be branded and adjusts the several extensible yokes and the plates 66 to accommodate the animals, and after the animal has been caught between the yokes 13 and 14 the hand-lever is operated to cause the elevated portion of the mechanism to descend, it being understood that the supplemental arms 37 and 38 and the arms 54 have been adjusted to permit the plates 66 to pass downwardly behind the animal. When the mechanism has been thus lowered, movement of the hand-lever 63 is continued to move the upper ends of the levers 57 and 58 forwardly and upon their pivotal connections with arms 55 and 56. This operation moves the bars 51 pivotally with respect to the arms 47 and 48 and brings the ends of the plates 66 into engagement with the animal's legs and forces them forwardly beneath its body, and at the same time the arms 47 and 48 are moved pivotally upon the lugs 43 to move the plates 66 in the direction of the yokes 44 and 45, so that the body of the animal is held tightly between the plates and the yokes.

The base 6 and the yoke 14 are provided with rings 6' and 6", respectively, and with these rings are engaged hooks 70, attached to the corners of a triangular plate 71, which lies in the position illustrated in Fig. 5 to support the body of the animal when the stock is tilted.

As shown in Fig. 5, the entire stock may be tilted over at an angle to facilitate the branding operation and is supported in this position by means of legs 72 and 73, which are pivoted to the frame 7 and to one of the bars 42, as shown.

When not in use, the braces 8 may be removed and the frame 7 may be folded downwardly against the movable portion of the mechanism.

What is claimed is—

1. An animal-stock comprising pivoted neck-yokes, means for holding the yokes yieldably in operative position, means for holding the yokes against the action of the last-named means, means for releasing the holding means, said means being disposed for engagement by an animal for operation thereby, and means for holding the yokes positively in their operative position, said means being movable into inoperative position.

2. In an animal-stock, the combination with head-confining mechanism, of means for moving the hind legs of an animal confined by said mechanism forwardly and for holding them against the stomach of the animal.

3. An animal-stock comprising pivotally-mounted neck-yokes, means for holding the yokes in their operative positions, means for holding the yokes in their inoperative positions, means for confining the body of an animal whose neck is engaged between the yokes, and means for moving the hind legs of an animal so confined forwardly, and for holding them against the stomach of the animal.

4. An animal-stock comprising pivotally-connected yokes, means for holding the yokes yieldably in operative position, means for holding the yokes against the action of the last-named means, means for releasing the holding means, said means being disposed for engagement by an animal for operation thereby, means for holding the yokes positively in their operative positions to confine the head of an animal, said means being movable into inoperative position, and means for moving the legs of an animal so confined into position to lie against the stomach of the animal and for holding them in such position.

In testimony whereof I affix my signature in presence of two witnesses.

JOHN L. PENTECOST.

Witnesses:
 SAM SMITH,
 CHARLEY SUTTON.